United States Patent
Mildh et al.

(10) Patent No.: US 12,063,560 B2
(45) Date of Patent: *Aug. 13, 2024

(54) SYSTEMS AND METHODS OF HANDING OVER A WIRELESS DEVICE

(71) Applicant: Telefonaktiebolaget LM Ericsson (publ), Stockholm (SE)

(72) Inventors: Gunnar Mildh, Sollentuna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,037

(22) Filed: Sep. 2, 2022

(65) Prior Publication Data

US 2022/0417806 A1 Dec. 29, 2022

Related U.S. Application Data

(63) Continuation of application No. 15/535,452, filed as application No. PCT/EP2017/058241 on Apr. 6, 2017, now Pat. No. 11,582,654.

(60) Provisional application No. 62/417,984, filed on Nov. 4, 2016.

(51) Int. Cl.
*H04W 36/00* (2009.01)

(52) U.S. Cl.
CPC .......... *H04W 36/0079* (2018.08); *H04W 36/0016* (2013.01)

(58) Field of Classification Search
CPC ............ H04W 36/0079; H04W 36/0016
See application file for complete search history.

(56) References Cited

U.S. PATENT DOCUMENTS

| 10,172,181 | B2 | 1/2019 | Kim et al. |
| 11,582,654 | B2 * | 2/2023 | Mildh ............ H04W 36/0079 |
| 2008/0025263 | A1 * | 1/2008 | Pelkonen ......... H04W 36/0066 370/332 |
| 2009/0016282 | A1 | 1/2009 | Gasparroni et al. |
| 2010/0054208 | A1 * | 3/2010 | Kojima ............. H04W 76/11 455/436 |

(Continued)

FOREIGN PATENT DOCUMENTS

| CN | 103916917 A | 7/2014 |
| CN | 104363598 A | 2/2015 |

(Continued)

OTHER PUBLICATIONS

Huawei et al., "QoS Flow to DRB Mapping", 3GPP TSG-RAN2 Meeting # 97, Feb. 13-17, 2017, pp. 1-6, Athens, Greece, R2-1701205.

(Continued)

*Primary Examiner* — Brenda H Pham
(74) *Attorney, Agent, or Firm* — Coats & Bennett, PLLC

(57) ABSTRACT

A source base station determines that a wireless device is to be handed over from the source base station to a target base station and sends, to the target base station in a handover signaling message, a current mapping between two or more flow identifiers and a first data radio bearer used for communication between the wireless device and the source base station. The source base station receives, from the target base station, an indication that the current mapping is to be used and hands over the wireless device from the source base station to the target base station.

17 Claims, 6 Drawing Sheets

(56) References Cited

U.S. PATENT DOCUMENTS

| | | |
|---|---|---|
| 2011/0080891 A1 | 4/2011 | Cai et al. |
| 2011/0310850 A1 | 12/2011 | Klingenbrunn et al. |
| 2013/0128790 A1 | 5/2013 | Futaki et al. |
| 2014/0128075 A1 | 5/2014 | Da Silva et al. |
| 2015/0131535 A1 | 5/2015 | Wallentin et al. |
| 2016/0277980 A1 | 9/2016 | Roeland et al. |
| 2016/0353337 A1 | 12/2016 | Zhu et al. |
| 2017/0339568 A1 | 11/2017 | Wang et al. |
| 2018/0242204 A1 | 8/2018 | Zhu et al. |
| 2018/0249389 A1* | 8/2018 | Zhu .................. H04W 36/0033 |
| 2019/0261240 A1 | 8/2019 | Fang et al. |

FOREIGN PATENT DOCUMENTS

| | | |
|---|---|---|
| CO | 20190001989 | 3/2019 |
| EP | 2774283 A1 | 9/2014 |
| EP | 2943008 A1 | 11/2015 |
| EP | 2943040 A1 | 11/2015 |
| EP | 3606149 A1 | 2/2020 |
| JP | 6017733 B2 | 11/2016 |
| JP | 2019533385 A | 11/2019 |
| RU | 2600456 C1 | 10/2016 |
| WO | 2013066396 A1 | 5/2013 |
| WO | 2018045574 A1 | 3/2018 |
| WO | 20180082602 A1 | 5/2018 |

OTHER PUBLICATIONS

Huawei et al., "General Principles for Flow to DRB Mapping", 3GPP TSG-RAN2 Meeting #95bis, Kaohsiung, TW, Oct. 10, 2016, pp. 1-2, R2-166198, 3GPP.

Ericsson, "UE context handling during inter RAT handover", 3GPP TSG-RAN WG2 #95-bis, Kaohsiung, Taiwan, Oct. 10, 2016, pp. 1-3, R2-166787, 3GPP.

Ericsson, "QoS framework for NR", 3GPP TSG-RAN WG2 #95-bis, Kaohsiung, Taiwan, 2016-10-10, pp. 1-4, R2-166801, 3GPP.

Ericsson, "Lossless intra-system handover with 5G-CN", 3GPP TSG-RAN WG3 #97-bis, Spokane, USA, Apr. 3, 2017, pp. 1-5, Tdoc R3-171148.

Intel, "Summary of email discussion on QoS framework", SA WG2 Meeting #116-BIS, Sanya, China, Aug. 29, 2016, pp. 1-14, S2-164759, 3GPP.

Samsung, "Nr Qos model for UL and DL", 3GPP TSG-RAN WG2 Meeting #96, Reno, USA, Nov. 14, 2016, pp. 1-5, R2-168057, 3GPP.

Zte et al., "RAN Consideration on the impact of QoS on NR CP", 3GPP TSG-RAN WG2 Meeting #95bis, Kaohsiung, Oct. 10, 2016, pp. 1-6, R2-166335, 3GPP.

Samsung, "QoS handling of offloaded bearer in LWA", 3GPP TSG-RAN2 Meeting #91bis, Malmo, Sweden, Oct. 5, 2015, pp. 1-3, R2-154371, 3GPP.

* cited by examiner

SYSTEMS AND METHODS OF HANDING OVER A WIRELESS DEVICE

RELATED APPLICATIONS

The present application is a continuation of U.S. patent application Ser. No. 15/535,452, which was filed on Jun. 13, 2017, which is a national stage application of PCT/EP2017/058241, which was filed Apr. 6, 2017, and claims benefit of U.S. Provisional Application 62/417,984, which was filed Nov. 4, 2016, the entire disclosure of each of which is incorporated by reference herein in its entirety.

TECHNICAL FIELD

The present invention relates generally to the field of communications, and in particular to handing over a wireless device from a source base station to a target base station.

BACKGROUND

The standardization organization 3GPP is currently in the processes of specifying a new Radio Interface called NR or 5G or G-UTRA as well as a Next Generation Packet Core Network (NGCN or NGC). The Next Gen Radio Access Network (RAN) may contain base stations support evolved LTE and/or NR radio access. There has been some agreement on a Quality of Service (QoS) concept for Next Gen System. Aspects of this QoS concept include that the RAN is provided with packet marking over the user plane between RAN and Core Network. The marking may include a flow identifier (ID) which the RAN later uses to provide QoS treatment over the radio. It may be up to RAN to define the AS-level QoS of Data Radio Bearers (DRBs) and how uplink and downlink packets are mapped to DRBs.

One of the problems with existing solutions is that after a wireless device has been handed over from a source base station to a target base station a reduction of end user and system performance could be applicable because different base stations may have different ways to do mapping of Flow IDs to Data Radio Bearers.

SUMMARY

It is an object of the present invention to improve the QoS handling in a hand-over scenario of a wireless device between base stations.

This object is achieved by the independent claims. Advantageous embodiments are described in the dependent claims.

According to an aspect, a method performed by a source base station of handing over a wireless device from the source base station to a target base station is provided. Said method comprises determining that a wireless device is to be handed over from the source base station to the target base station; and sending, to the target base station, a current mapping between one or more flow identifiers and a first set of data radio bearers used for communication between the wireless device and the source base station.

According to a further aspect, a source base station for handing over a wireless device to a target base station is provided. The source base station the source base station comprising a processor and a memory, said memory containing instructions executable by said processor, whereby said source base station is operative to determine that the wireless device is to be handed over from the source base station to the target base station. The source base station is further operative to send, to the target base station, a current mapping between one or more flow identifiers and a first set of data radio bearers used for communication between the wireless device and the source base station.

According to a further aspect, a source base station for handing over a wireless device to a target base station is provided. The source base station comprises a processing circuit configured to determine that the wireless device is to be handed over from the source base station to the target base station. The processing circuit is further configured to send, to the target base station, a current mapping between one or more flow identifiers and a first set of data radio bearers used for communication between the wireless device and the source base station.

According to a further aspect, a method performed by a wireless device of handing over the wireless device from a source base station to a target base station if provided. Said method comprises determining that the wireless device is to be handed over from the source base station to the target base station; and sending, to the target base station, a current mapping between one or more flow identifiers and a first set of data radio bearers used for communication between the wireless device and the source base station.

According to a further aspect, a wireless device that is capable of being handed over from a source base station to a target base station is provided. Said wireless device comprising a processor and a memory, said memory containing instructions executable by said processor, whereby said wireless device is operative to determine that the wireless device is to be handed over from the source base station to the target base station. The wireless device is further operative to send, to the target base station, a current mapping between one or more flow identifiers associated with respective packet flows originating or terminating at the wireless device and a first set of data radio bearers used for communication between the wireless device and the source base station.

According to a further aspect, a wireless device that is capable of being handed over from a source base station to a target base station is provided. Said wireless device comprises a processing circuit configured to determine that the wireless device is to be handed over from the source base station to the target base station. The processing circuit is further configured to send, to the target base station, a current mapping between one or more flow identifiers associated with respective packet flows originating or terminating at the wireless device and a first set of data radio bearers used for communication between the wireless device and the source base station According to a further aspect, a method performed by the target base station of handing over a wireless device from a source base station to the target base station is provided. Said method comprises obtaining a current mapping between one or more flow identifiers and a first set of data radio bearers used for communication between the wireless device and the source base station and determining a new mapping between the one or more flow identifiers and a second set of data radio bearers used for communication between the wireless device and the target base station. The method further comprises signaling the new mapping to the wireless device.

According to a further aspect, a target base station for handing over a wireless device from a source base station to the target base station is provided. Said target base station comprising a processor and a memory, said memory containing instructions executable by said processor, whereby said target base station is operative to obtain a current mapping between one or more flow identifiers associated with respective packet flows originating or terminating at the wireless device and a first set of data radio bearers used for communication between the wireless device and the source base station. The target base station is further operative to determine a new mapping between the one or more flow identifiers and a second set of data radio bearers used for communication between the wireless device and the target base station, and signal, to the wireless device, the new mapping According to a further aspect, a target base station for handing over a wireless device from a source base station to the target base station is provided. Said target base station comprises a processing circuit configured to obtain a current mapping between one or more flow identifiers associated with respective packet flows originating or terminating at the wireless device and a first set of data radio bearers used for communication between the wireless device and the source base station. The processing circuit is further configured to determine a new mapping between the one or more flow identifiers and a second set of data radio bearers used for communication between the wireless device and the target base station, and signal, to the wireless device, the new mapping.

One advantage of the above mentioned aspects is to enable the flow to DRB mapping also after a handover from a source to a target base station, which means that QoS differentiation according to operator policies may be applied also in the target base station which leads to improved end user and system performance.

One further advantage is that the flow to DRB mapping applies immediately when the UE arrives in the target base station or cell which reduces delay.

BRIEF DESCRIPTION OF THE FIGURES

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
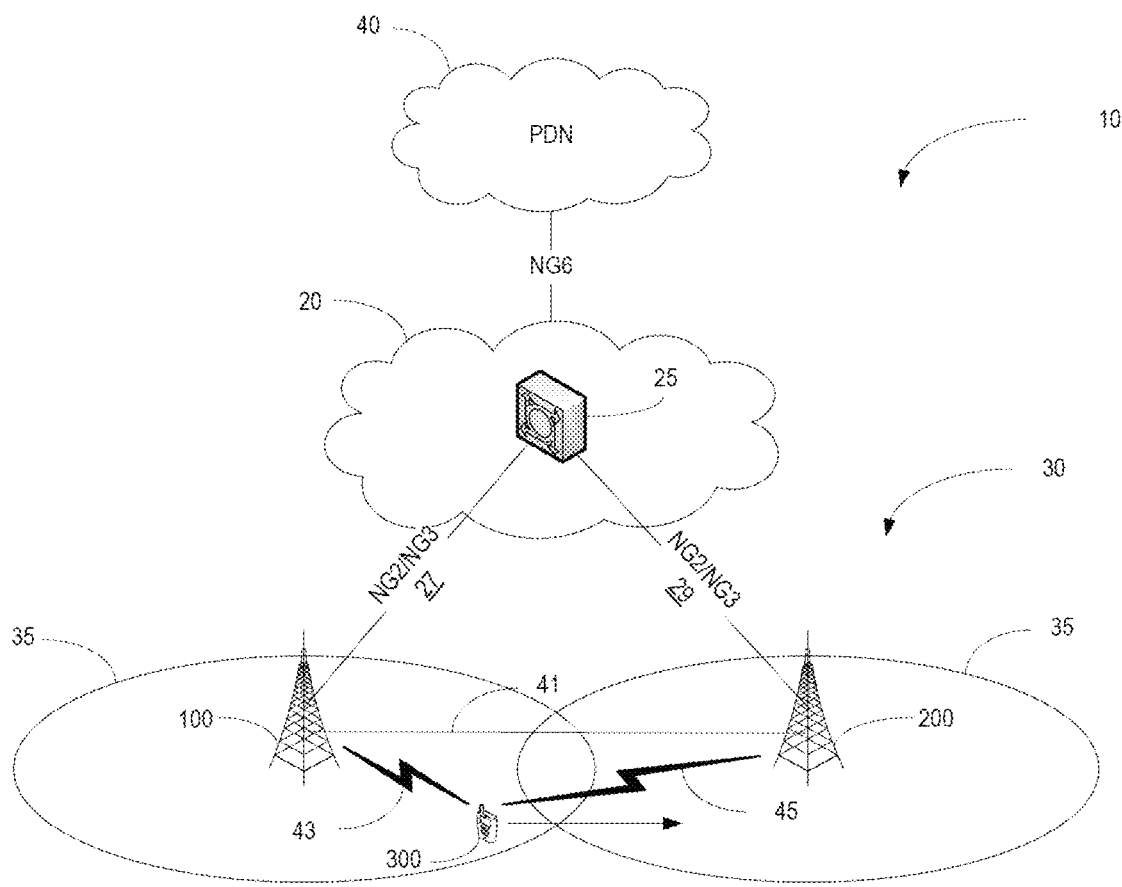
FIG. 1 illustrates one embodiment of a system for handing over a wireless device in accordance with various aspects as described herein.

This disclosure includes describing systems and methods for sharing channel information between co-located radio nodes. For instance, FIG. 1 illustrates one embodiment of a system 10 for handing over a wireless device 300 in accordance with various aspects as described herein. The wireless device or UE 300 is connected to a base station 100, denoted as source base station 100 via a connection 43. The source base station 100 is adapted to provide connection in a cell 35. The wireless device/UE 300 or the network may determine that the wireless device/UE 300 is better served by the other base station 200 which also serves a cell 35, which can be named as a target base station 200. The source base station 100 and the target base station 200 may be connected via a X2-interface or XN-interface 41. Base stations 100, 200 may be part of a NextGen RAN 30 supporting evolved LTE and/or New Radio (NR) radio access.

Both, the source base station 100 and the target base station 200 are connected via reference points NG2 (control plane) and NG3 (user plane) to a core network node 25, which may be part of a NextGen Core network 20. The NextGen Core network 20 is connected via NG6 reference point to a Packet Data Network (PDN) 40. The Data network may be an operator external public or private data network or an intra-operator data network, e.g. for provision of IMS services. This reference point may correspond to SGi for 3GPP accesses. The Data network and the NextGen Core network 20 may be part of a core network 10.

Figure 2:
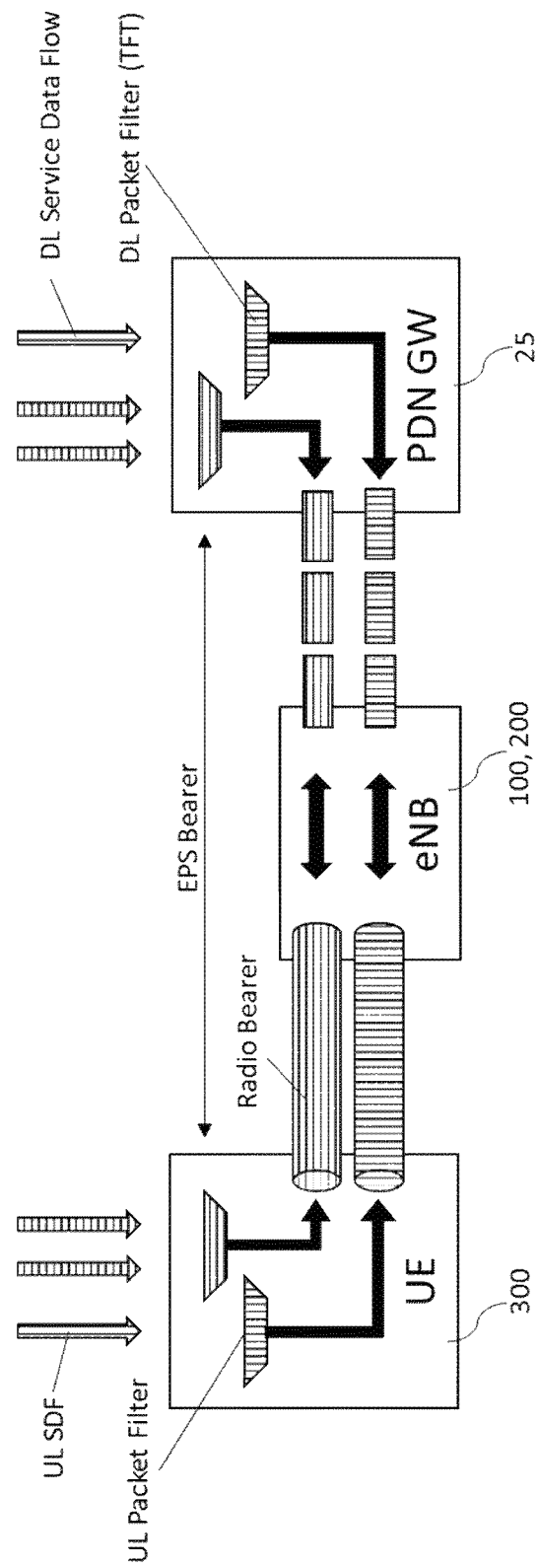
FIG. 2 illustrates one embodiment of a system for QoS mapping and filtering in accordance with various aspects as described herein.

FIG. 2 illustrates one embodiment of a system of QoS mapping and filtering in accordance with various aspects as described herein. In this example the wireless device 300, which can be a User Equipment (UE) in this embodiment, comprises Uplink (UL) Packet Filters (TFT) which are adapted to determine, based on the source and destination IP addresses and port numbers, in which bearer to carry each packet. Each TFT is allocated to an Evolved Packet System (EPS) radio bearer between the UE 300 and a radio base station 100, 200, which is depicted as an eNodeB (eNB) in the example of FIG. 2. The radio base stations 100, 200 can be radio base stations according to any standard, like 4G (LTE) or 5G (NR=New Radio). On the core network side between the eNB 100, 200 and the Packet Data Network (PDN) Gateway (GW) 25, Downlink (DL) Packet Filter (TFT) are installed to map the DL Service Data Flows (SDF) to S1 data flows towards the eNB 100, 200.

Figure 3:
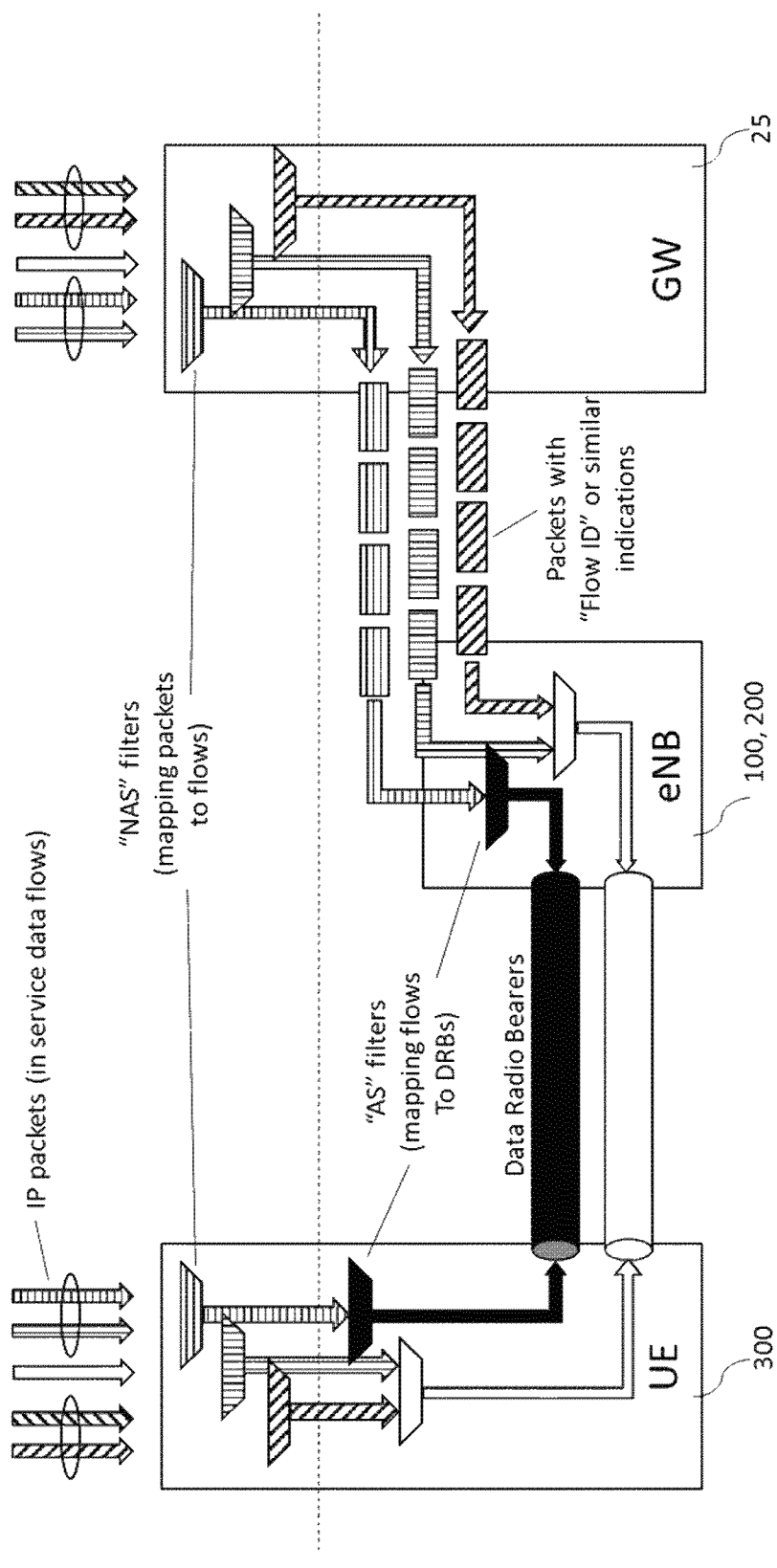
FIG. 3 illustrates one embodiment of a system for mapping packets to flows in accordance with various aspects as described herein.

FIG. 3 illustrates one embodiment of a system of mapping packets to flows in accordance with various aspects as described herein. This figure depicts the changes expected for the next generation (NextGen) core network (CN). Instead of mapping IP packets to EPS bearers as this has been depicted in FIG. 2, the NextGen core network is supposed to group packets into flows. This may be done by packet filters similar to the TFTs defined in EPS. The NextGen CN and the UE 300 could ensure that all packets to and from, for example the same IP/Port number tuple, belong to a "flow". On their way through the transport network each packet may be marked with some sort of "Flow ID". In FIG. 3 these filters are denoted as Non-Access Stratum (NAS) filters which maps data packets to flows. Like in Evolved (E)-UTRA/Evolved Packet Core (EPC), the core network determines and applies the downlink filters locally and it may configure the UE 300 by means of NAS signalling with a set of uplink "NAS filters" included in one or multiple pre-authorized QoS rules. The QoS rules may have been pre-authorized at the Protocol Data Unit (PDU) session establishment or during the lifetime of the PDU session.

In the UE 300, Access-Stratum (AS) filters have been introduced which maps the flows to the data radio bearers (DRB). The AS is allocated to Layer 1 and 2, wherein NAS is allocated to higher layers (above PDCP/RRC layer). In the example of FIG. 3 the IP packets (in service data flows) are mapped to three different flows which have been marked with horizontal, vertical and transversal lines. The three flows in this embodiment are further mapped via the AS filters to two Data Radio Bearers which have been marked in black and white. However, it is clear for a person skilled in the art to have more or less flows which could be mapped to more or less data radio bearers. In the radio base station 100, 200 which is a eNB in the embodiment, the AS filters map the Data Radio Bearers to Packets with flow IDs or similar indications. The NAS filters are included in the gateway (GW) 25 which then maps the packets with flow IDs to the IP packets in service data flows. The direction of the packet flow can be uplink or downlink direction.

The AS filters determine the DRB by just looking at the "flow ID" of the incoming packet, i.e., the AS layer does not need to be aware of services, traffic-flow-templates and address/port tuples. The NAS filters, on the other hand, determine the mapping from services to "flow ID" but do not need to be aware of DRBs. The two-step filtering fits well to the pre-configured QoS mapping (a.k.a. pre-authorized QoS). The eNB 100, 200 determines for each flow ID the DRB and may provide such a configuration to the UE 300 via RRC (Radio Resource Control). This AS configuration is independent of the corresponding NAS mapping (IP packets to "flows") except that the AS and NAS should use a common set of flow IDs. Hence, the RAN configures the "AS filters" whereas the CN configures the "NAS filters".

Similarly, to the PDN Connections in EPS the NextGen CN will support multiple PDU sessions. Each PDU session is mapped to a separate transport network bearer in order to separate them even if the contained packets have an overlapping IP address range. Also the UE 300 must be able to determine which IP packet belongs to which PDN session in order to route packets correctly. This may also need to be taken into account in the reflective QoS filtering.

It may be noted that in all steps listed below in the different embodiments, where the information about mapping of flow identifiers to data radio bearers is provided, this mapping information may be enhanced by also providing the mapping of flow identifiers to the PDU Session ID each flow identifier is associated with. The encoding may be done in a per flow ID manner or by grouping flow identifiers that belong to a particular PDU Session ID.

In the following embodiments it is assumed that a wireless device or UE 300 is connected to a base station, which is referred to as source base station 100 and that the UE 300 may start sending or receiving data. It is further assumed that the data may be associated with different flows which are identified by their flow IDs. The classification of flows is performed in the UE 300 in the uplink direction (from UE 300 to source base station 100) and in the core network for downlink direction (from the source radio base station 100 to the UE 300).

Figure 4:
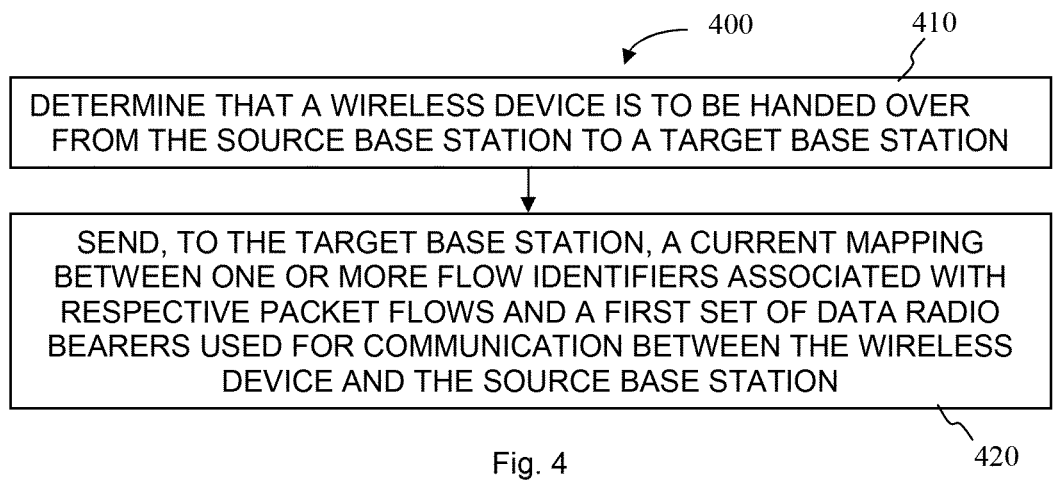
FIG. 4 illustrates one embodiment of a method of handover implemented by the source base station in accordance with various aspects as described herein.

FIG. 4 illustrates an exemplary method 400 of handover implemented by the source base station 100. The method 400 is implemented when a wireless device 300, served by the source base station 100, is to be handed over to a target base station 200. The method begins with the source base station 100 determining that a wireless device 300 is to be handed over from the source base station 100 to the target base station 200 (block 410). Responsive to the determination, the source base station 100 sends, to the target base station 200, a current mapping between one or more flow identifiers associated with respective packet flows originating or terminating at the wireless device and a first set of data radio bearers used for communication between the wireless device and the source base station (block 420). The current mapping may be received from a network node or from the wireless device 300.

The source base station may send the current mapping directly to the target base station 200 over a side haul interface, or indirectly via another network node (e.g., wireless device 300 or core network node).

Figure 5:
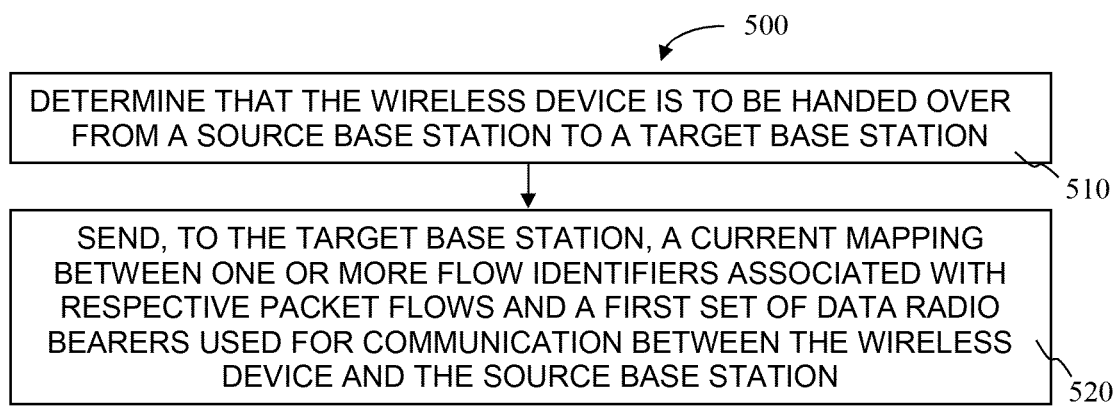
FIG. 5 illustrates one embodiment of a method of handover implemented by the wireless device in accordance with various aspects as described herein.

According to a further embodiment the source base station 100 receives, from the target base station 200, an indication of a new mapping between the one or more flow identifiers and a second set of data radio bearers used for communication between the wireless device 300 and the target base station 200. This indication is sent to the wireless device 300. In another embodiment the indication of the new mapping between the one or more flow identifiers and a second set of data radio bearers used for communication between the wireless device 300 and the target base station 200 is received from the wireless device 300 and is sent to the target base station 200. The sending of the new mapping could be done prior to or contemporaneous with or after the wireless device 300 being handed over to the target base station 200. These further embodiments allow to use different number of DRBs in target and source base station or cell. Changing the flow ID to DRB mapping in the target base station 200 enables optimized performance in the target base station 200 considering local configuration, load or radio conditions FIG. 5 illustrates a corresponding method 500 of handover implemented by the wireless device 300. The method 500 is implemented when the wireless device 300 is to be handed over from a source base station 100 to a target base station 200. The method begins with the wireless device 300 determining that it is to be handed over from the source base station 100 to the target base station 200 (block 510). Responsive to the determination, the wireless device 300 sends, to the target base station 200, a current mapping between one or more flow identifiers associated with respective packet flows originating or terminating at the wireless device 300 and a first set of data radio bearers used for communication between the wireless device 300 and the source base station 100 (block 520). The wireless device 300 may send the current mapping to the target base station 200 prior to executing the handover, during the handover, or immediately after the handover.

According to a further embodiment the sending of the current mapping may be done via the source base station 100.

According to a further embodiment the current mapping of the flow identifier to the data radio bearer may be conveyed by the wireless device 300 from the source base station 100 to the target base station 200. It may also be possible for the wireless device 300 to receive information from the network, which might be the source or target radio base station 100, 200, how to perform the flow identifier to data radio bearer mapping in the target base station 200 or cell. This embodiment may allow the use of a different number of data radio bearers in the target and source base station/cell 100.

According to a further embodiment the information transferred to the wireless device 300 may be transferred as part of control plane message (e.g. RRC), or user plane signaling (e.g. PDCP, RLC, MAC). The messages may be part of the handover procedure between two base station 100, 200, or state transition procedure (e.g. when wireless device or UE 300 returns to active state from some power saving state).

According to a further embodiment a new mapping between the one or more flow identifiers and a second set of data radio bearers used for communication between the wireless device 300 and the target base station 200 is obtained. Said obtaining may include receiving, from the target base station 200, an indication of the new mapping. Said receiving may be done via the source base station 100. An indication that acknowledges receiving of the new mapping may be sent to the target base station 200. Said sending of the acknowledgement indication may be done via the source base station 100. The acknowledgment may be transferred over a network interface and/or over the radio interface, prior or after the wireless device 300 has arrived in the target base station 200. The advantage of having the mapping prior to the wireless device 300 has arrived at the target base station 200 is that the wireless device 300 can use the new mapping as soon as traffic starts in the target base station 200 or cell or at a later stage.

According to a further embodiment the new mapping is the same as the current mapping. It may also be possible that the new mapping removes or adds a data radio bearer from/to the first set to obtain the second set.

According to a further embodiment the mapping may be signaled explicitly to the wireless device 300 or may be conveyed implicitly using the reflective QoS concept where the target base station 200 or RAN node maps DL packets to a given data radio bearer, and then the wireless device 300 will perform similar mapping of UL packets associated with the same application or transport flow to the same data radio bearer in the UL. In other words, the wireless device 300, after it has been handed over to the target base station 200, may receive, from the target base station 200, one or more flow identifiers associated with one or more downlink packet flows on a new data radio bearer used for communication between the wireless device 300 and the target base station 200. The wireless device 300 then maps the one or more flow identifiers to the one or more uplink packet flows and transmits the one or more uplink packet flows on the new data radio bearer to the target base station 200. This embodiment has the advantage that no explicit signaling of mapping information between Flow ID and DRB to the wireless device 300 is necessary. The wireless device 300 just reflects the QoS setting which it has received towards the target base station 200.

According to a further embodiment the wireless device 300, after it has been handed over to the target base station 200, maps the one or more flow identifiers to a default data radio bearer used for communication between the wireless device 300 and the target base station 200. This embodiment has the advantage that the mapping to a default bearer can be done even if the transfer of mapping information failed or is not possible.

According to a further embodiment the wireless device 300 maps the one or more flow identifiers to the first set based on the current mapping after a failed handover to the target base station 200.

The one or more flow identifiers may be associated with respective packet flows originating or terminating at the wireless device 300. The flow ID may be conveyed together with UL or DL packets. According to a further embodiment the flow ID may be signaled separately. This allows a more flexible handling of signaling messages so that it is not necessary to adapt already existing messages.

The source base station 100 may send the current mapping to the target base station 200 prior to executing the handover, during the handover or contemporaneous with the handover, or immediately after the handover. The advantage of providing the mapping prior to the handover is that the target base station 200 is already aware of the existing mapping such that the target base station 200 can take over the communication very fast after the handover procedure without much delay. If the mapping is provided during or contemporaneously with the handover the control data traffic is reduced because the mapping could be integrated in the handover signaling. If the mapping is provided immediately after the handover, the risk of providing mapping information even if the handover is failed, is very low.

The one or more flow identifiers may be associated with respective packet flows originating or terminating at the wireless device. Providing means for efficient signaling of the flow ID to data radio bearer mapping over the radio minimizing overhead, maximized the chance of delivery of critical message (such as handover command).

The signaling of the current or new data radio bearer to flow mapping may be performed over an interface between the target and source base station (e.g. X2, XN) or via other nodes e.g. CN nodes (via S1/NG-2). The mapping may be conveyed in a signaling message. The signaling message may be related to handover signaling or context fetch signaling.

Figure 6:
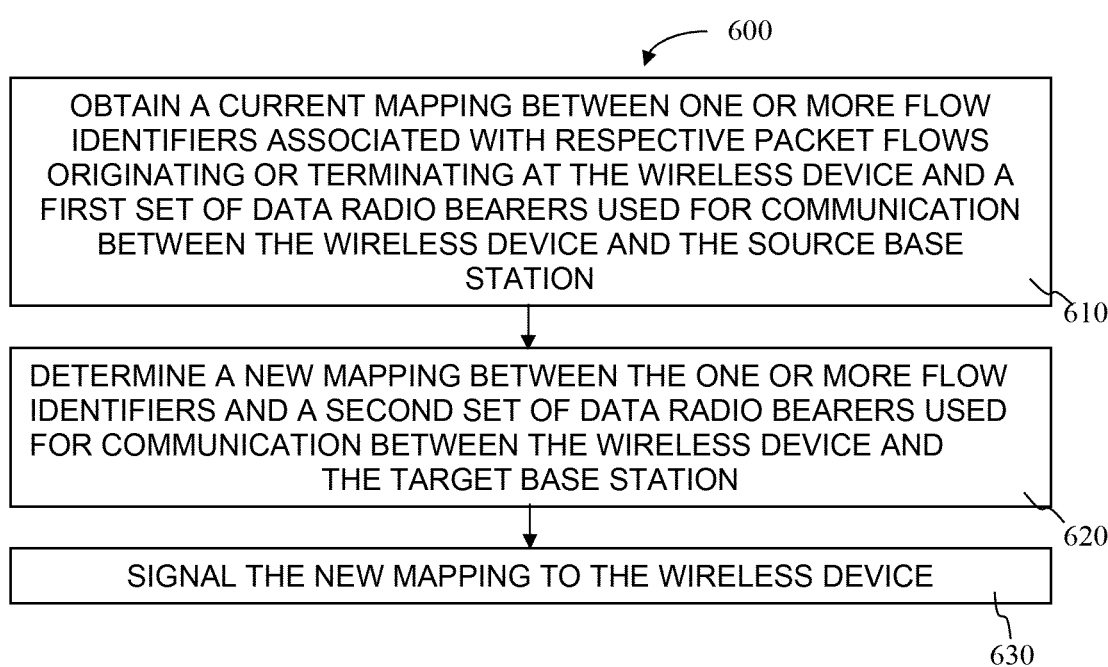
FIG. 6 illustrates one embodiment of a method of handover implemented by the target base station in accordance with various aspects as described herein.

FIG. 6 illustrates a method 600 of handover implemented by the target base station 200. The method 600 is implemented when the wireless device 300 is to be handed over from a source base station 100 to the target base station 200. To begin, the target base station 200 obtains a current mapping between one or more flow identifiers associated with respective packet flows originating or terminating at the wireless device 300 and a first set of data radio bearers used for communication between the wireless device 300 and the source base station 100 (block 610). The target base station 200 may obtain the current mapping directly from the source base station 100, indirectly from the source base station 100 via a network node in the core network 20, or from the wireless device 300 that is being handed over. After receiving the current mapping, the target base station 200 determines a new mapping between the one or more flow identifiers and a second set of data radio bearers used for communication between the wireless device 300 and the target base station 200 (block 620). The target base station 200 signals the new mapping or an indication of the new mapping to the wireless device 300 (block 630). The sending may be done via the source base station 100.

The target base station 200 may indicate in a further embodiment that the current mapping should be used. This indication may either be explicit (via a signaling flag) or implicit from the fact that the number of data radio bearers are the same and no new mapping is signaled. The target base station 200 may indicate that the number of data radio bearers should be reduced and that some flows which mapped on one data radio bearer should be moved to another data radio bearer. This may either be explicit (e.g. flow 1, 3, 7 should be moved to data radio bearer 4) or there could be some implicit rules in the wireless device 300 saying that if a data radio bearer is removed all flows mapped on that data radio bearer should be mapped on another data radio bearer (e.g. a default data radio bearer, or a data radio bearer of lower or higher priority). The target base station 200 may indicate that the number of data radio bearers should be increased and that some flows mapped on one data radio bearer should be moved to another data radio bearer. This may either be explicit (e.g. flow 1, 3, 7 should be moved to data radio bearer 4) or there could be some implicit rules in the wireless device 300 saying that if a data radio bearer is added some flows (e.g. associated with a certain QoS) mapped on another data radio bearer should be moved to this data radio bearer.

According to a further embodiment, no flows may initially be mapped to the new data radio bearer which was added after the mobility event. Instead, the target base station 200 may upon arrival of the wireless device or UE 300 start moving some old or new incoming flows to the new data radio bearer. The moving of flows may be done explicitly or using the reflective QoS concept where the data radio bearer starts mapping DL packets on the new data radio bearer, and the wireless device 300 maps corresponding UL packet associated with the same session on the same data radio bearer in UL.

According to a further embodiment said receiving is prior to or contemporaneous with or after the wireless device being handed over to the source base station 100.

According to a further embodiment said determining includes determining that the new mapping is the same as the current mapping or determining that the new mapping removes or adds a data radio bearer from/to the first set to obtain the second set. Said determining may also include that after the wireless device 300 has been handed over to the target base station 200, determining a new mapping between the one or more flow identifiers and a new data radio bearer of the second set.

According to a further embodiment said determining includes that after the wireless device 300 has been handed over to the target base station 200, determining a new mapping between the one or more flow identifiers associated with one or more downlink packet flows on a new data radio bearer used for communication between the wireless device 300 and the target base station 200.

According to a further embodiment the target base station 200 transmits to the wireless device 300 the one or more downlink packet flows on the new data radio bearer based on the new mapping; and in response to said transmitting, receiving, from the wireless device 300, one or more uplink packet flows on the new data radio bearer that are mapped to the one or more flow identifiers.

According to a further embodiment the one or more flow identifiers are associated with respective packet flows originating or terminating at the wireless device 300.

Figure 7:
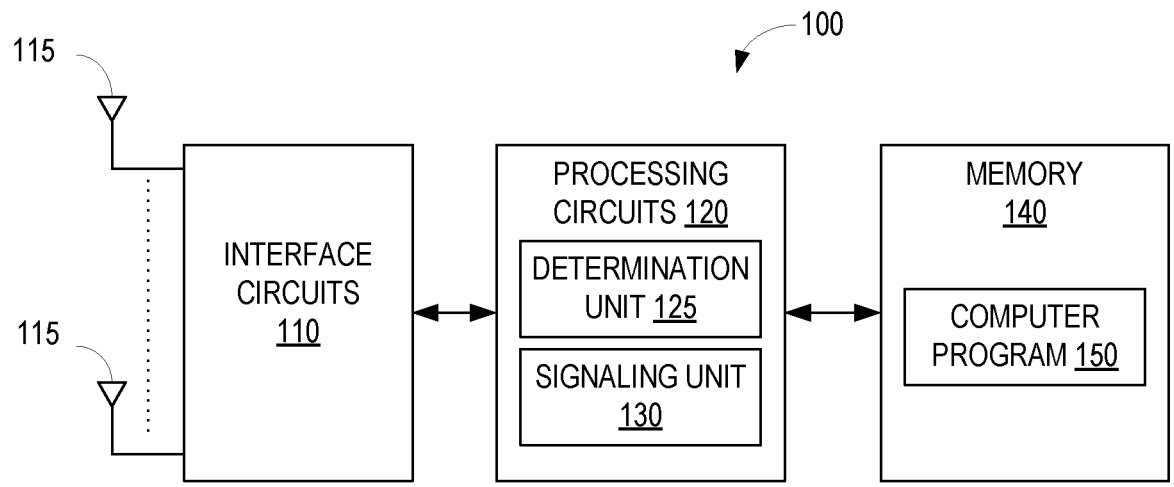
FIG. 7 illustrates one embodiment of a source base station or other radio network node in accordance with various aspects as described herein.

FIG. 7 illustrates an exemplary source base station 100 or another radio network node configured to operate as herein described. According to one embodiment the source base station 100 is for handing over a wireless device 300 to a target base station 200. The source base station 100 is configured to determine that the wireless device 300 is to be handed over from the source base station 100 to the target base station 200 and to send, to the target base station 200, a current mapping between one or more flow identifiers and a first set of data radio bearers used for communication between the wireless device 300 and the source base station 100. According to a further embodiment the base station 100 comprises an interface circuit 110, processing circuit 120, and memory 140. The interface circuit 110 is coupled to one or more antennas 115 and comprises the radio frequency (RF) components needed for communicating with the wireless devices 300 over a wireless communication channel. Typically, the RF components include a transmitter and receiver adapted for communications according to the NR or 5G standard, or other standard where mapping of flow identifiers to data radio bearers is used.

The processing circuit 120 processes the signals transmitted to or received by the base station 100. Such processing includes coding and modulation of transmitted signals, and the demodulation and decoding of received signals. In one embodiment, the processing circuit 120 comprises a determination unit 125 for determining that a wireless device 300 will be handed over to a target base station 200, and a signaling unit 130 for sending a current mapping of flow identifiers to a first set of data radio bearers used for communication between the wireless device 300 and the source base station 100. The processing circuit 120 may comprise one or more microprocessors, hardware, firmware, or a combination thereof. In one embodiment, the determination unit 125 and signaling unit 130 are implemented by a single microprocessor. In other embodiments, the determination unit 125 and signaling unit 130 may be implemented using different microprocessors.

Memory 140 comprises both volatile and non-volatile memory for storing computer program code and data needed by the processing circuit 120 for operation. Memory 140 may comprise any tangible, non-transitory computer-readable storage medium for storing data including electronic, magnetic, optical, electromagnetic, or semiconductor data storage. Memory 140 stores a computer program 150 comprising executable instructions that configure the processing circuit 120 to implement methods 400 according to FIG. 4. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 150 for configuring the processing circuit 120 as herein described may be stored in a removable memory, such as a portable compact disc, portable digital video disc, or another removable media.

The computer program 150 may also be embodied in a carrier such as an electronic signal, optical signal, radio signal, or computer readable storage medium.

Figure 8:
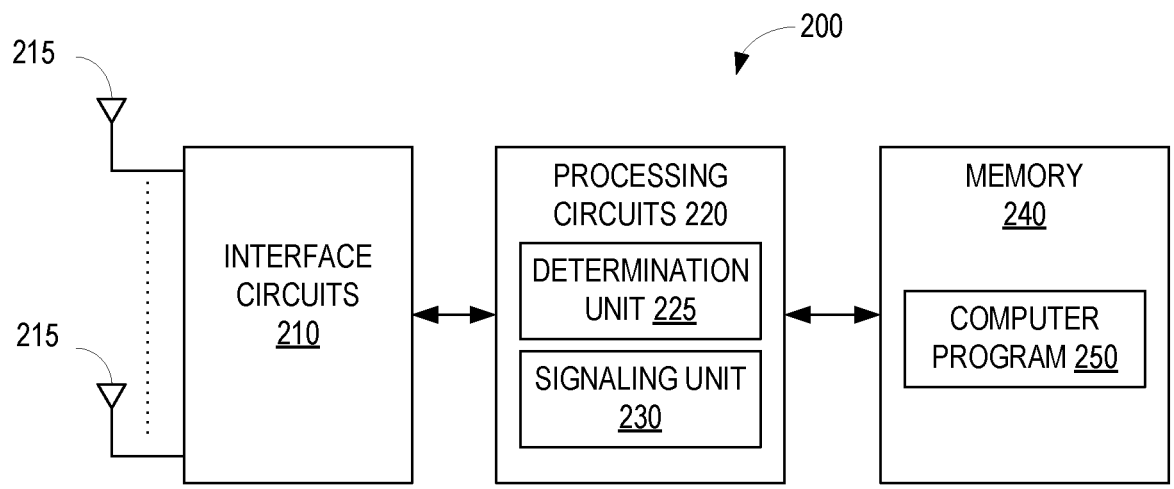
FIG. 8 illustrates one embodiment of a target base station or other radio network node in accordance with various aspects as described herein.

FIG. 8 illustrates an exemplary target base station 200 or another radio network node configured to operate as herein described. According to one embodiment the target base station 200 for handing over a wireless device 300 from a source base station 100 to the target base station 200 is configured to obtain a current mapping between one or more flow identifiers associated with respective packet flows originating or terminating at the wireless device 300 and a first set of data radio bearers used for communication between the wireless device 300 and the source base station 100 and determine a new mapping between the one or more flow identifiers and a second set of data radio bearers used for communication between the wireless device 300 and the target base station 200; and signal, to the wireless device 300, the new mapping.

The target base station 200 comprises an interface circuit 210, processing circuit 220, and memory 240. The interface circuit 210 is coupled to one or more antennas 215 and comprises the radio frequency (RF) components needed for communicating with the wireless devices 300 over a wireless communication channel. Typically, the RF components include a transmitter and receiver adapted for communications according to the NR or 5G standard, or other standard where mapping of flow identifiers to data radio bearers is used.

The processing circuit 220 processes the signals transmitted to or received by the target base station 200. Such processing includes coding and modulation of transmitted signals, and the demodulation and decoding of received signals. In one embodiment, the processing circuit 220 comprises an acquisition unit 225 for obtaining a current mapping of flow identifiers to a first set of data radio bearers used for communication between the wireless device 300 and the source base station 100, a mapping unit 230 for determining a new mapping between the flow identifiers and a second set of data radio bearers used for communication between the wireless device 300 and the target base station 200, and a signaling unit 235 for sending the new mapping to the wireless device 300. The processing circuit 220 may comprise one or more microprocessors, hardware, firmware, or a combination thereof. In one embodiment, the acquisition unit 225, mapping unit 230, and signaling unit 235 are implemented by a single microprocessor. In other embodiments, the acquisition unit 225, mapping unit 230, and signaling unit 235 may be implemented using different microprocessors.

Memory 240 comprises both volatile and non-volatile memory for storing computer program code and data needed by the processing circuit 220 for operation. Memory 240 may comprise any tangible, non-transitory computer-readable storage medium for storing data including electronic, magnetic, optical, electromagnetic, or semiconductor data storage. Memory 240 stores a computer program 250 comprising executable instructions that configure the processing circuit 220 to implement methods 400 according to FIG. 6. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 250 for configuring the processing circuit 220 as herein described may be stored in a removable memory, such as a portable compact disc, portable digital video disc, or other removable media. The computer program 250 may also be embodied in a carrier such as an electronic signal, optical signal, radio signal, or computer readable storage medium.

Figure 9:
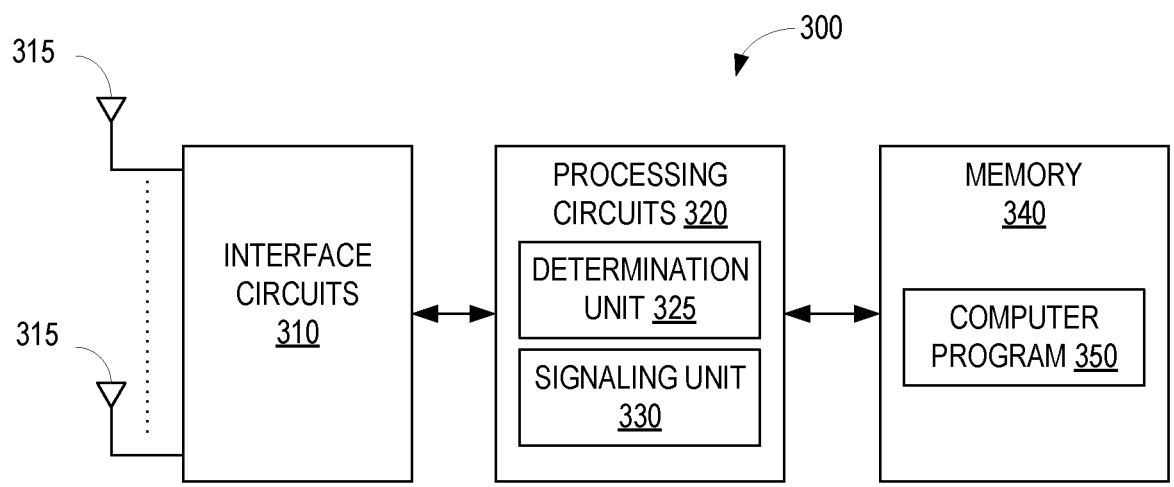
FIG. 9 illustrates one embodiment of a wireless device in accordance with various aspects as described herein.

FIG. 9 illustrates an exemplary wireless device 300 configured to operate as herein described. According to one embodiment the wireless device 300 is capable of being handed over from a source base station 100 to a target base station 200, said wireless device 300 is configured to determine that the wireless device 300 is to be handed over from the source base station 100 to the target base station 200, and to send, to the target base station 200, a current mapping between one or more flow identifiers associated with respective packet flows originating or terminating at the wireless device 300 and a first set of data radio bearers used for communication between the wireless device 300 and the source base station 100.

According to a further embodiment the wireless device 300 comprises an interface circuit 310, processing circuit 320, and memory 340. The interface circuit 310 is coupled to one or more antennas 315 and comprises the radio frequency (RF) components needed for communicating with the base stations 100 and 200 over a wireless communication channel. Typically, the RF components include a transmitter and receiver adapted for communications according to the NR or 5G standard, or other standard where mapping of flow identifiers to data radio bearers is used.

The processing circuit 320 processes the signals transmitted to or received by the wireless device 300. Such processing includes coding and modulation of transmitted signals, and the demodulation and decoding of received signals. In one embodiment, the processing circuit 320 comprises a determination unit 325 for determining that the wireless device 300 will be handed over from a source base station 100 to a target base station 200 and a signaling unit 330 for sending, to the target base station 200, a current mapping of flow identifiers to a first set of data radio bearers used for communication between the wireless device 300 and the source base station 100. The processing circuit 320 may comprise one or more microprocessors, hardware, firmware, or a combination thereof. In one embodiment, the determination unit 325 and signaling unit 330 are implemented by a single microprocessor. In other embodiments, the determination unit 325 and signaling unit 330 may be implemented using different microprocessors.

Memory 340 comprises both volatile and non-volatile memory for storing computer program code and data needed by the processing circuit 320 for operation. Memory 340 may comprise any tangible, non-transitory computer-readable storage medium for storing data including electronic, magnetic, optical, electromagnetic, or semiconductor data storage. Memory 340 stores a computer program 350 comprising executable instructions that configure the processing circuit 320 to implement methods 400 according to FIG. 4. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, the computer program 350 for configuring the processing circuit 320 as herein described may be stored in a removable memory, such as a portable compact disc, portable digital video disc, or other removable media. The computer program 350 may also be embodied in a carrier such as an electronic signal, optical signal, radio signal, or computer readable storage medium.

Figure 10:
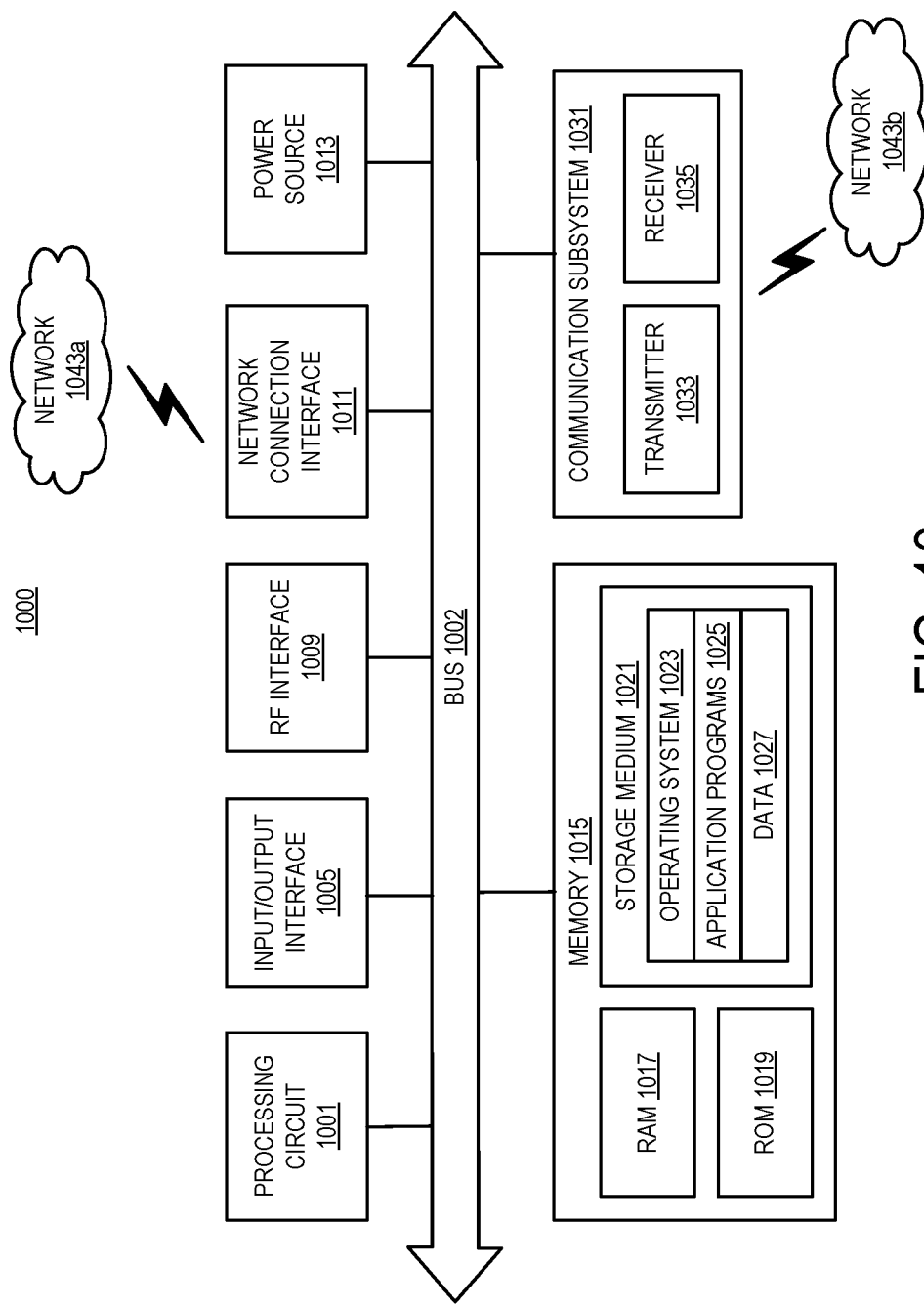
FIG. 10 illustrates another embodiment of a wireless device in accordance with various aspects as described herein.

FIG. 10 illustrates another embodiment of a wireless device 1000 in accordance with various aspects as described herein. In some instances, the wireless device 1000 may be referred as a user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, an Internet-of-Things (IoT) device, or some other like terminology. Further, the wireless device may operate over one or more frequency bands and one or more radio access technologies (RATs). In other instances, the wireless device 1000 may be a set of hardware components.

In FIG. 10, the wireless device 1000 may be configured to include a processing circuit 1001 that is operatively coupled to an input/output interface 1005, a radio frequency (RF) interface 1009, a network connection interface 1011, a memory 1015 including a random access memory (RAM) 1017, a read only memory (ROM) 1019, a storage medium 1021 or the like, a communication subsystem 1031, a power source 1013, another component, or any combination thereof. The storage medium 1021 may include an operating system 1023, an application program 1025, data 1027, or the like. Specific devices may utilize all of the components shown in FIG. 10, or only a subset of the components, and levels of integration may vary from device to device. Further, specific devices may contain multiple instances of a component, such as multiple processing circuits, memories, transceivers, transmitters, receivers, etc. For instance, a computing device may be configured to include a processing circuit and a memory.

In FIG. 10, the processing circuit 1001 may be configured to process computer instructions and data. The processing circuit 1001 may be configured as any sequential state machine operative to execute machine instructions stored as machine-readable computer programs in the memory, such as one or more hardware-implemented state machines (e.g., indiscrete logic, FPGA, ASIC, etc.); programmable logic together with appropriate firmware; one or more stored-program, general-purpose processing circuits, such as a microprocessor or Digital Signal Processor (DSP), together with appropriate software; or any combination of the above. For example, the processing circuit 1001 may include two computer processing circuits. In one definition, data is information in a form suitable for use by a computer. It is important to note that a person having ordinary skill in the art will recognize that the subject matter of this disclosure may be implemented using various operating systems or combinations of operating systems.

In the current embodiment, the input/output interface 1005 may be configured to provide a communication interface to an input device, output device, or input and output device. The wireless device 1000 may be configured to use an output device via the input/output interface 1005. A person of ordinary skill will recognize that an output device may use the same type of interface port as an input device. For example, a USB port may be used to provide input to and output from the wireless device 1000. The output device may be a speaker, a sound card, a video card, a display, a monitor, a printer, an actuator, an emitter, a smartcard, another output device, or any combination thereof. The wireless device 1000 may be configured to use an input device via the input/output interface 1005 to allow a user to capture information into the wireless device 1000. The input device may include a mouse, a trackball, a directional pad, a trackpad, a presence-sensitive input device, a display such as a presence-sensitive display, a scroll wheel, a digital camera, a digital video camera, a web camera, a microphone, a sensor, a smartcard, and the like. The presence-sensitive input device may include a digital camera, a digital video camera, a web camera, a microphone, a sensor, or the like to sense input from a user. The presence-sensitive input device may be combined with the display to form a presence-sensitive display. Further, the presence-sensitive input device may be coupled to the processing circuit. The sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, the RF interface 1009 may be configured to provide a communication interface to RF components such as a transmitter, a receiver, and an antenna. The network connection interface 1011 may be configured to provide a communication interface to a network 1043*a*. The network 1043*a* may encompass wired and wireless communication networks such as a local-area network (LAN), a wide-area network (WAN), a computer network, a wireless network, a telecommunications network, another like network or any combination thereof. For example, the network 1043*a* may be a Wi-Fi network. The network connection interface 1011 may be configured to include a receiver and a transmitter interface used to communicate with one or more other nodes over a communication network according to one or more communication protocols known in the art or that may be developed, such as Ethernet, TCP/IP, SONET, ATM, or the like. The network connection interface 1011 may implement receiver and transmitter functionality appropriate to the communication network links (e.g., optical, electrical, and the like). The transmitter and receiver functions may share circuit components, software or firmware, or alternatively may be implemented separately.

In this embodiment, the RAM 1017 may be configured to interface via the bus 1002 to the processing circuit 1001 to provide storage or caching of data or computer instructions during the execution of software programs such as the operating system, application programs, and device drivers. In one example, the wireless device 1000 may include at least one hundred and twenty-eight megabytes (128 Mbytes) of RAM. The ROM 1019 may be configured to provide computer instructions or data to the processing circuit 1001. For example, the ROM 1019 may be configured to be invariant low-level system code or data for basic system functions such as basic input and output (I/O), startup, or reception of keystrokes from a keyboard that are stored in a non-volatile memory. The storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives. In one example, the storage medium 1021 may be configured to include an operating system 1023, an application program 1025 such as a web browser application, a widget or gadget engine or another application, and data 1027.

In FIG. 10, the processing circuit 1001 may be configured to communicate with a network 1043*b* using the communication subsystem 1031. The network 1043*a* and the network 1043*b* may be the same network or networks or different network or networks. The communication subsystem 1031 may be configured to include one or more transceivers used to communicate with the network 1043*b*. For example, the communication subsystem 1031 may be configured to include one or more transceivers used to communicate with one or more remote transceivers of another wireless device such as a base station of a radio access network (RAN) according to one or more communication protocols known in the art or that may be developed, such as IEEE 802.xx, CDMA, WCDMA, GSM, LTE, UTRAN, WiMAX, 5G NR, NB IoT, or the like.

In another example, the communication subsystem 1031 may be configured to include one or more transceivers used to communicate with one or more remote transceivers of another wireless device such as user equipment according to one or more communication protocols known in the art or that may be developed, such as IEEE 802.xx, CDMA, WCDMA, GSM, LTE, UTRAN, WiMAX, 5G NR, NB IoT, or the like. Each transceiver may include a transmitter 1033 or a receiver 1035 to implement transmitter or receiver functionality, respectively, appropriate to the RAN links (e.g., frequency allocations and the like). Further, the transmitter 1033 and the receiver 1035 of each transceiver may share circuit components, software or firmware, or alternatively may be implemented separately. In the current embodiment, the communication functions of the communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 1031 may include cellular communication, Wi-Fi communication, Bluetooth communication, and GPS communication. The network 1043b may encompass wired and wireless communication networks such as a local-area network (LAN), a wide-area network (WAN), a computer network, a wireless network, a telecommunications network, another like network or any combination thereof. For example, the network 1043b may be a cellular network, a Wi-Fi network, and a near-field network. The power source 1013 may be configured to provide an alternating current (AC) or direct current (DC) power to components of the wireless device 1000.

In FIG. 10, the storage medium 1021 may be configured to include a number of physical drive units, such as a redundant array of independent disks (RAID), a floppy disk drive, a flash memory, a USB flash drive, an external hard disk drive, thumb drive, pen drive, key drive, a high definition digital versatile disc (HD-DVD) optical disc drive, an internal hard disk drive, a Blu-Ray optical disc drive, a holographic digital data storage (HDDS) optical disc drive, an external mini-dual in-line memory module (DIMM) synchronous dynamic random access memory (SDRAM), an external micro-DIMM SDRAM, a smartcard memory such as a subscriber identity module or a removable user identity module (SIM/RUIM), other memory, or any combination thereof. The storage medium 1021 may allow the wireless device 1000 to access computer executable instructions, application programs or the like, stored on transitory or non-transitory memory media, to off-load data, or to upload data. An article of manufacture, such as one utilizing a communication system may be tangibly embodied in storage medium 1021, which may comprise a computer-readable medium.

The functionality of the methods described herein may be implemented in one of the components of the wireless device 1000 or partitioned across multiple components of the wireless device 1000. Further, the functionality of the methods described herein may be implemented in any combination of hardware, software or firmware. In one example, the communication subsystem 1031 may be configured to include any of the components described herein. Further, the processing circuit 1001 may be configured to communicate with any of such components over the bus 1002. In another example, any of such components may be represented by program instructions stored in memory that when executed by the processing circuit 1001 performs the corresponding functions described herein. In another example, the functionality of any of such components may be partitioned between the processing circuit 1001 and the communication subsystem 1031. In another example, the non-computative-intensive functions of any of such components may be implemented in software or firmware and the computative-intensive functions may be implemented in hardware.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "a further embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

The invention claimed is:

1. A method, performed by a source base station, the method comprising:
   determining that a wireless device is to be handed over from the source base station to a target base station;
   sending, to the target base station in a handover signaling message, a current mapping between two or more flow identifiers and a first data radio bearer used for communication between the wireless device and the source base station;
   receiving, from the target base station, an indication that the current mapping is to be used; and
   handing over the wireless device from the source base station to the target base station.

2. The method of claim 1, wherein the two or more flow identifiers are associated with respective packet flows originating or terminating at the wireless device.

3. A source base station comprising:
   processing circuitry and memory, the memory storing instructions executable by the processing circuitry whereby the source base station is configured to:
      determine that a wireless device is to be handed over from the source base station to a target base station;
      send, in a handover signaling message to the target base station, a current mapping between two or more flow identifiers and a first data radio bearer used for communication between the wireless device and the source base station;
      receive, from the target base station, an indication that the current mapping should be used; and
      hand over the wireless device from the source base station to the target base station.

4. A method, performed by a target base station, the method comprising:
   obtaining, from a handover signaling message received from a source base station, a current mapping between two or more flow identifiers and a first data radio bearer used for communication between a wireless device and the source base station;
   determining a new mapping between the two or more flow identifiers and a second data radio bearer used for communication between the wireless device and the target base station, wherein the new mapping is the same mapping as the current mapping;
   indicating, to the source base station, that the current mapping is to be used for further communication with the wireless device;
   accepting hand over of the wireless device from the source base station to the target base station.

5. The method of claim 4, wherein obtaining the current mapping from the source base station comprises receiving the current mapping from the wireless device via the source base station.

6. The method of claim 4, wherein determining the new mapping between the two or more flow identifiers and the second data radio bearer comprises determining, after the wireless device has been handed over to the target base station, the new mapping as being between the two or more flow identifiers and a new data radio bearer.

7. The method of claim 4, wherein determining the new mapping comprises determining the new mapping after the wireless device has been handed over to the target base station, the new mapping comprising a mapping between the two or more flow identifiers associated with one or more downlink packet flows on a new data radio bearer used for communication between the wireless device and the target base station.

8. The method of claim 7, further comprising transmitting, to the wireless device, the one or more downlink packet flows on the new data radio bearer based on the new mapping and, in response, receiving, from the wireless device, one or more uplink packet flows on the new data radio bearer that are mapped to the two or more flow identifiers.

9. The method of claim 4, wherein the two or more flow identifiers are associated with respective packet flows originating or terminating at the wireless device.

10. A target base station comprising:
    processing circuitry and memory, the memory storing instructions executable by the processing circuitry whereby the target base station is configured to:
       obtain, from a handover signaling message received from a source base station, a current mapping between two or more flow identifiers, associated with respective packet flows originating or terminating at the wireless device, and a first data radio bearer used for communication between the wireless device and the source base station;
       determine a new mapping between the two or more flow identifiers and a second data radio bearer used for communication between the wireless device and the target base station, wherein the new mapping is the same mapping as the current mapping; and
       indicate, to the source base station, that the current mapping is to be used for further communication with the wireless device;
       accept hand over of the wireless device from the source base station to the target base station.

11. The target base station of claim 10, wherein to obtain the current mapping from the source base station, the target base station is configured to receive the current mapping from the wireless device via the source base station.

12. The target base station of claim 10, wherein to determine the new mapping between the two or more flow identifiers and the second data radio bearer, the target base station is configured to determine, after the wireless device has been handed over to the target base station, the new mapping as being between the two or more flow identifiers and a new data radio bearer.

13. The target base station of claim 10, wherein to determine the new mapping the target base station is configured to determine the new mapping after the wireless device has been handed over to the target base station, the new mapping comprising a mapping between the two or more flow identifiers associated with one or more downlink packet flows on a new data radio bearer used for communication between the wireless device and the target base station.

14. The target base station of claim 13, wherein the target base station is further configured to transmit, to the wireless device, the one or more downlink packet flows on the new data radio bearer based on the new mapping and, in response, receive, from the wireless device, one or more uplink packet flows on the new data radio bearer that are mapped to the two or more flow identifiers.

15. The target base station of claim 10, wherein the two or more flow identifiers are associated with respective packet flows originating or terminating at the wireless device.

16. A non-transitory computer readable medium storing a computer program product for controlling a source base station in a communication network, the computer program product comprising software instructions that, when run on the source base station, cause the source base station to:
- determine that a wireless device is to be handed over from the source base station to a target base station;
- send, to the target base station in a handover signaling message, a current mapping between two or more flow identifiers and a first data radio bearer used for communication between the wireless device and the source base station;
- receive, from the target base station, an indication that the current mapping is to be used; and
- hand over the wireless device from the source base station to the target base station.

17. A non-transitory computer readable medium storing a computer program product for controlling a target base station in a communication network, the computer program product comprising software instructions that, when run on the target base station, cause the target base station to:
- obtain, from a handover signaling message received from a source base station, a current mapping between two or more flow identifiers and a first data radio bearer used for communication between a wireless device and the source base station;
- determine a new mapping between the two or more flow identifiers and a second data radio bearer used for communication between the wireless device and the target base station, wherein the new mapping is the same mapping as the current mapping;
- indicate, to the source base station, that the current mapping is to be used for further communication with the wireless device;
- accept hand over of the wireless device from the source base station to the target base station.

* * * * *

UNITED STATES PATENT AND TRADEMARK OFFICE
CERTIFICATE OF CORRECTION

| | | |
|---|---|---|
| PATENT NO. | : 12,063,560 B2 | Page 1 of 2 |
| APPLICATION NO. | : 17/902037 | |
| DATED | : August 13, 2024 | |
| INVENTOR(S) | : Mildh et al. | |

It is certified that error appears in the above-identified patent and that said Letters Patent is hereby corrected as shown below:

On the Title Page

On Page 2, in Item (56), under "OTHER PUBLICATIONS", in Column 2, Line 13, delete "Meeting #116-BIS," and insert -- Meeting #116-bis, --, therefor.

On Page 2, in Item (56), under "OTHER PUBLICATIONS", in Column 2, Line 15, delete "Qos" and insert -- QoS --, therefor.

On Page 2, in Item (56), under "OTHER PUBLICATIONS", in Column 2, Line 22, delete "Malmo," and insert -- Malmö, --, therefor.

In the Specification

In Column 1, Line 8, delete "2017," and insert -- 2017, now U.S. Pat. No. 11,582,654, --, therefor.

In Column 1, Line 24, delete "Packet Core" and insert -- Core --, therefor.

In Column 1, Line 26, delete "stations support" and insert -- stations that support --, therefor.

In Column 1, Line 61, delete "The source base station the source base station" and insert -- The source base station is the source base station --, therefor.

In Column 2, Line 16, delete "if provided." and insert -- is provided. --, therefor.

In Column 2, Line 48, delete "station" and insert -- station. --, therefor.

In Column 3, Line 8, delete "mapping" and insert -- mapping. --, therefor.

In Column 6, Line 50, delete "conditions" and insert -- conditions. --, therefor.

Signed and Sealed this
Twenty-second Day of April, 2025

Coke Morgan Stewart
*Acting Director of the United States Patent and Trademark Office*

In Column 16, Line 58, delete "actual such" and insert -- such --, therefor.

In the Claims

In Column 18, Line 35, in Claim 10, delete "mapping; and" and insert -- mapping; --, therefor.

In Column 18, Line 38, in Claim 10, delete "device;" and insert -- device; and --, therefor.